Dec. 17, 1968 D. E. BLAHUT 3,417,384

MAGNETIC MEMORY

Filed July 20, 1964 4 Sheets-Sheet 1

INVENTOR
D. E. BLAHUT
BY Herbert M. Shapiro
ATTORNEY

FIG. 2
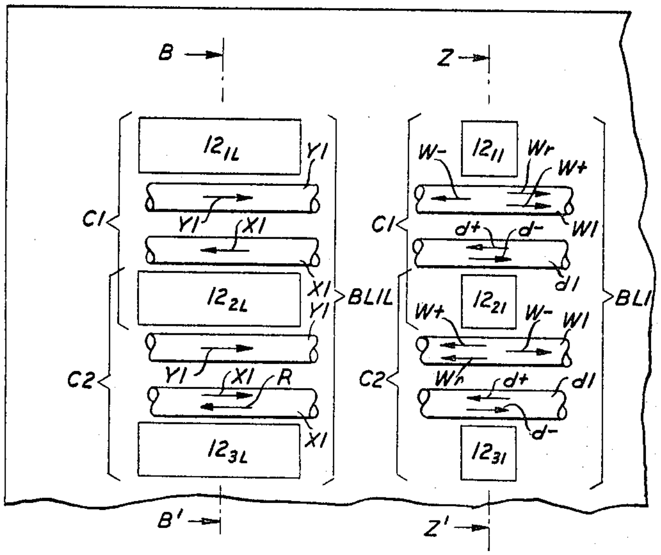
FIG. 3a
BL1
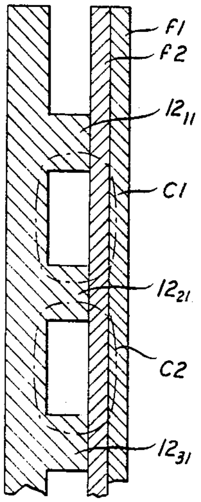
FIG. 3b
BL1L
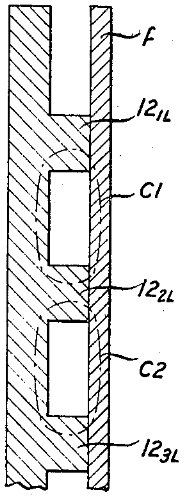
FIG. 4
ACCESS SWITCH
| | C1 | C2 |
|---|---|---|
| INITIAL | → | → |
| PRIME | → | ← |
| CLEAR | ← | → |
| WRITE | → | → |
| READ | → | → |

WRITE & READ "1" WITH A "0" STORED PREVIOUSLY

| | | C1 | C2 |
|---|---|---|---|
| ASSUMED "0" STORED PREVIOUSLY | | → | → |
| CLEAR | | → | ← |
| WRITE "1" | H | ← | ← |
| | L | → | → |
| READ "1" | H | ← | ← |
| | L | → | ← |

WRITE & READ "1" WITH A "1" STORED PREVIOUSLY

| | | C1 | C2 |
|---|---|---|---|
| ASSUMED "1" STORED PREVIOUSLY | | ← | ← |
| CLEAR | | → | ← |
| WRITE "1" | H | ← | ← |
| | L | → | → |
| READ "1" | H | ← | ← |
| | L | → | ← |

FIG. 6c
WRITE & READ "0" WITH A "0" STORED PREVIOUSLY
| | | C1 | C2 |
|---|---|---|---|
| ASSUMED "0" STORED PREVIOUSLY | | → | → |
| CLEAR | | → | ← |
| WRITE "0" | H | → | → |
| | L | ← | ← |
| READ "0" | H | → | → |
| | L | → | ← |
FIG. 6d
WRITE & READ "0" WITH A "1" STORED PREVIOUSLY
| | | C1 | C2 |
|---|---|---|---|
| ASSUMED "1" STORED PREVIOUSLY | | ← | ← |
| CLEAR | | → | ← |
| WRITE "0" | H | → | → |
| | L | ← | ← |
| READ "0" | H | → | → |
| | L | → | ← |
FIG. 7a
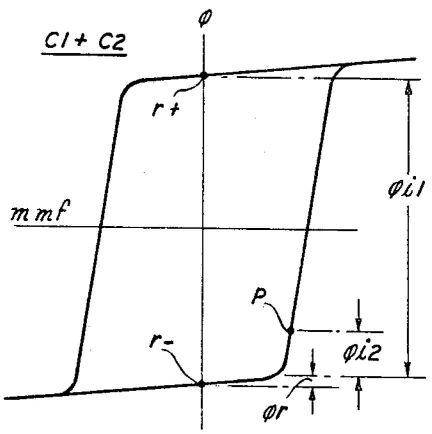
FIG. 7b
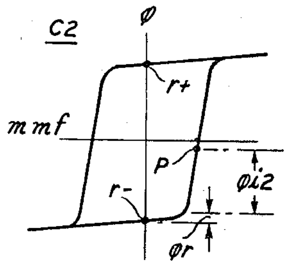

United States Patent Office 3,417,384
Patented Dec. 17, 1968

3,417,384
MAGNETIC MEMORY
Donald E. Blahut, Irvington, N.J., assignor to Bell Telephone Laboratories, Incorporated, New York, N.Y., a corporation of New York
Filed July 20, 1964, Ser. No. 383,747
7 Claims. (Cl. 340—174)

ABSTRACT OF THE DISCLOSURE

The variety of different amplitude and polarity pulses necessary for operation of some magnetic memories is provided herein by a two-core-per-bit access switch in which only enabled ones of the cores of each location in the access switch are switched. A priming circuit arrangement enables the cores of a selected location to switch in series or individually and a following sequential switching operation resets so enabled cores. The access switch is shown in the form of a waffle iron arrangement integral with a nondestructive read waffle iron memory.

This invention relates to magnetic memories and, more particularly, to magnetic memories in which storage and retrieval of information require drive pulses of different amplitudes and polarities.

One memory requiring such pulses on one of its drive conductors is a nondestructive read "waffle iron memory" and is disclosed in the copending application Ser. No. 215,318, of A. H. Bobeck and J. L. Smith, filed Aug. 7, 1962, now Patent 3,274,571, issued Sept. 20, 1966. In this connection, a waffle iron memory is one which includes a relatively low reluctance base plate having posts thereon and an overlay of a material having substantially rectangular hysteresis characteristics juxtaposed with said posts. The nondestructive read waffle iron memory is one having the same physical arrangement as the waffle iron memory but also including a second overlay between the posts and the first overlay. The second overlay member, in addition, comprises a material having substantially rectangular hysteresis characteristics as does the first overlay member. The material of the second overlay, however, is characterized by a coercive force lower than that of the first. Because the first overlay is positioned on top of the second in the nondestructive read configuration, such a memory is commonly referred to as a "piggy-back" waffle iron memory. Another memory including contiguous high coecive force and low coercive force layers and requiring such pulses is the piggy-back twistor memory disclosed in Patent No. 3,067,408 of W. A. Barrett, Jr., issued Dec. 4, 1962.

Specifically, the operation of a piggy-back type memory entails the provision of a relatively low amplitude pulse during the memory-read operation. During the read operation, the flux in only the overlay of relatively low coercive force material is reversed and the "read" pulse is limited in amplitude to effect flux reversal only in that overlay. Upon termination of this read pulse, the flux in that overlay is once again reversed to its initial condition by the field of the overlay of relatively high coercive force material. In this manner, nondestructive read out is provided. In contradistinction, during the write operation the flux in the relatively high coercive force overlay is reversed, requiring a relatively high amplitude write pulse. Consequently, the piggy-back memory requires relatively high and relatively low amplitude pulses of different polarities.

The provision of pulses of different amplitudes and polarities for such a memory requires rather complicated and expensive accessing equipment, and, typically, such accessing equipment introduces additional problems. For example, a ferrite core access switch, which provides such pulses in response to drive pulses of different amplitudes, simultaneously shuttles flux in the nonselected bit locations of the memory. In fact, flux is shuttled, in this manner, to the extent that only in memories of limited storage capacity can the output signal be distinguished from the output due to accumulated shuttle flux during a read operation.

A better understanding of this problem underscores, at the same time, the problems of the prior art and the efficacy of this invention. Accordingly, this problem is discussed more fully. Specifically, an access switch is itself accessed in a manner similar to that of a memory, as is well known. That is, the access switch is accessed by X and Y conductors by means of which half-select currents are applied to a location of the access switch on a coincident current basis. In turn, as in the memories themselves, nonselected locations of the access switch experience half-select pulses resulting in shuttle flux therein. As long as ferrite cores, having high relative squareness, are used for the access switch, and as long as pulses of similar amplitudes are provided thereby, there is, for all practical purposes, little shuttle flux induced in bit locations of the nonselected words of the memory to which the nonselected locations of the access switch are coupled via word conductors. If materials, other than ferrite cores, having relatively low relative squareness are used for the access switch, for example, a waffle iron configuration employing, as an overlay, a metal such as a commercially available molypermalloy, the nonselected locations of the access switch introduce considerable shuttle flux in the nonselected words of the memory. In this connection, a figure of merit which is useful to measure the departure from an ideal hysteresis characteristic is called the "relative squareness." The relative squareness for a square (ideal) characteristic is "one." That is, the shuttling of flux from one remanent state into saturation at the same remanent state and back produces no flux change. For ferrites, the relative squareness is about 0.98. For molypermalloys the relative squareness is about 0.85. Accordingly, waffle iron memories having molypermalloy overlays, typically, tend to be more noisy, that is to say, exhibit more flux shuttling than memories using ferrite material. The introduction of such shuttle flux is of little consequence during a write operation because the memory output is not taken at that time. The problem arises during the read operation wherein the shuttle flux in nonselected bit locations of the memory is "accumulated" by sense conductors to mask legitimate output signals.

Consider, specifically, for example, the biased ferrite core access switch. Conventionally, a location in such a switch is driven by a bias, and coincident X and Y pulses inducing a positive pulse in the corresponding word conductor of the memory. Upon removal of the Y and X pulses, the bias reverses the flux in the location inducing a negative pulse in that corresponding word conductor. The positive pulse, provided by such a switch typically is of a polarity opposite to, and of an amplitude about equal to, that of the negative pulse. These pulses are generally termed "read" and "write" pulses, respectively. In this context, the biased core access switch induces "half-select" pulses in nonselected word conductors in the conventional manner described above.

For compatibility with a piggy-back configuration, however, such a switch is called upon to provide a relatively low amplitude read pulse. The bias core access switch can be utilized to provide such a pulse by accessing the selected location of the access switch with relatively low amplitude X and Y pulses utilizing only a small fraction of the flux available in the selected location thereof to induce the required low amplitude pulse in the proper word conductor. Under these conditions, nonselected word conductors of the memory experience pulses which are large fractions of the pulse experienced by the selected word conductor even when ferrite cores are used for the switch.

The reason for this is that in the piggy-back configuration the amount of flux necessary to provide the maximum required current during operation of the memory determines the size and characteristics of a magnetic core in a location of the access switch. In terms of a hysteresis characteristic of such material for a location of the access switch, the amount of flux (termed the irreversible component of flux) measured between the positive and negative maximum remanent states thereof is set by the requirements of the memory generally during the write operation. That is to say, a location of the access switch is of a material and of a geometry to provide sufficient flux to drive all the bit locations associated therewith. During the read operation, however, only a fraction of this flux is required and utilized, approximately one-tenth thereof. If the selected location of the access switch is driven by low amplitude X and Y pulses which drive the location only enough to provide the required flux for reading the memory, the reversible component of flux is approximately as large as the irreversible component. In this connection, the reversible component of flux is that which arises in response to flux shuttling corresponding to the generally horizontal saturation portions of a hysteresis characteristic. These reversible and irreversible components induce a pulse in the selected word conductor. For nonselected locations in the access switch there is no irreversible component of flux but there is a reversible component which is approximately equal to that reversible component in the selected location. Since, for the selected location, the reversible component and the irreversible component are about equal, the reversible component for a like core in each of the nonselected locations is about half the flux switched in the selected location. Consequently, the pulse induced in a word conductor coupled to a nonselected location of the access switch is about half that of the pulse induced in the word conductor coupled to the selected bit location of the access switch. It is clear that so much shuttle flux is induced in the bit locations of nonselected words that information in the memory is retrievable for memories of only limited size.

It is an object of this invention to provide a new and novel access switch for a sequential access magnetic memory requiring pulses of the type described.

A more particular object of this invention is to provide a relatively inexpensive access switch for a sequential access piggy-back waffle iron memory which access switch subjects nonselected bit locations of the memory to a reduced amount of flux shuttling.

It is a further object of this invention to provide a relatively inexpensive access switch-memory piggy-back waffle iron memory unit.

In accordance with this invention, a two-core-per-location arrangement is utilized as a functional unit (location) of an access switch and each location is wired to provide, controllably, series switching or, alternatively, single switching of the two cores of each location. The series switching operation provides an equivalent large flux hysteresis characteristic corresponding to the flux of both cores of a location enabling the access switch to produce a large amount of flux required for a first memory-write operation (termed a "clear" operation); the single switching operation provides the relatively low flux hysteresis characteristic corresponding to the flux of only one core of a location enabling the access switch to produce the small amount of flux required for a second memory-write operation and a memory-read operation. In this manner, the amount of flux coupling the selected word conductor is much greater than that coupling the nonselected word conductors and the signal-to-noise ratio is considerably improved.

The above and further objects of this invention are realized in one embodiment thereof wherein a sequential access, two-core-per-bit-location, piggy-back waffle iron memory and a two-core-per-location waffle iron access switch share a common base plate. Row and column conductors thread the posts of the access switch in a manner to switch, controllably, the flux in both "cores" of a selected location therein for an initial write operation and to switch the flux in only one core thereof for a second write and read operation. Such controllable switching is in response to prime and drive pulses applied to the conductors by pulse sources connected to the row and column conductors of the access switch. In this manner the nonselected word conductors of the memory are not subjected to relatively high flux conditions during the read operation.

Accordingly, a feature of this invention is a two-core-per-bit access switch including first and second conductors and first and second pulse sources connected thereto for applying pulses in a manner to switch controllably, the flux in both "cores" of each location thereof, or, alternatively, in only one core thereof.

Another feature in accordance with this invention is a two-core-per-bit waffle iron access switch of the type described and a piggy-back waffle iron memory sharing a common base plate.

The above and further objects and features of this invention will be understood more fully with reference to the following description rendered in conjunction with the accompanying drawing wherein:

FIG. 2 is a portion of the memory and access switch of FIG. 1;

Figure 1:
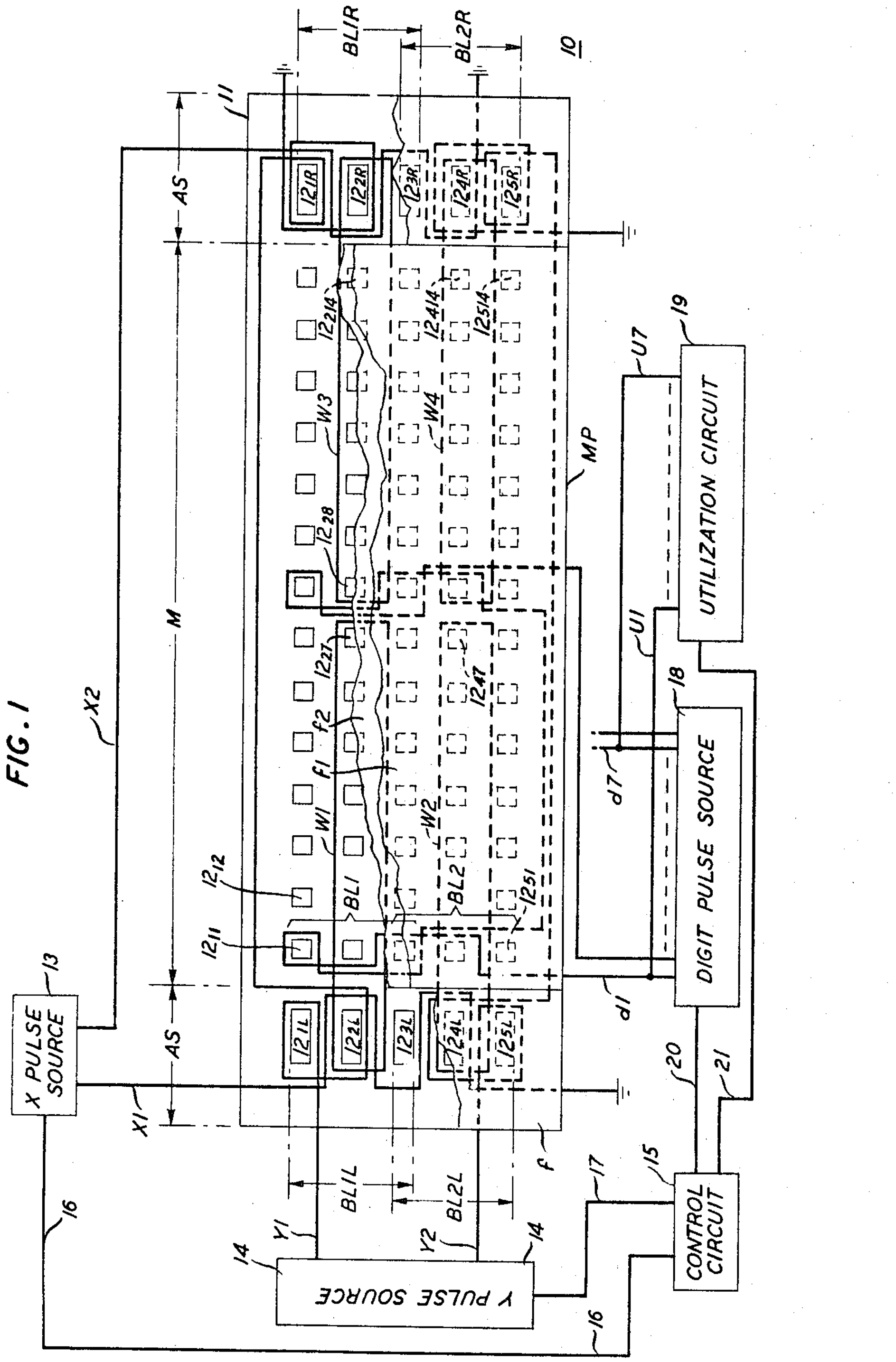
FIG. 1 is a schematic illustration of an integral unit comprising a piggy-back waffle iron memory and access switch in accordance with this invention.
Figures 5, 6A, 6B:
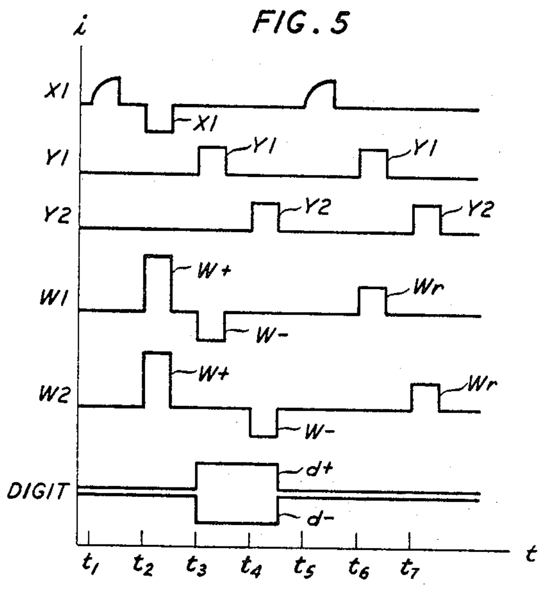

FIGS. 3*a* and 3*b* are representative cross sections through the memory portion and throught the access switch portion of the memory unit as shown in FIG. 2;

FIG. 4 is a chart illustrating the various magnetic con- through the memory portion and through the access switch of FIG. 1 is driven during operation in accordance with this invention;

FIG. 5 is a pulse diagram illustrating the access switch input pulses producing and the memory input pulses resulting from the flux conditions of FIG. 4;

FIGS. 6*a*, 6*b*, 6*c*, and 6*d* are charts illustrating the various magnetic conditions to which the flux in a representative bit location of the memory of FIG. 1 is driven during operation in accordance with this invention; and FIGS. 7*a* and 7*b* are hysteresis characteristics associated with the representative bit location of an access switch in accordance with this invention.

FIG. 1 shows a piggy-back waffle iron memory unit 10 including a piggy-back waffle iron memory portion integral with a two-core-per-bit access switch in accordance with this invention. Specifically, the memory unit 10 includes a memory plane MP comprising a relatively low reluctance base plate 11 having posts 12 protruding therefrom. The posts are organized into center and right and left groups as viewed in the figure. The center group defines the memory portion designated M; the right and left groups define the access switch designated AS. The posts of the memory portion are arranged generally in rows and columns and, accordingly, each post designation bears subscripts corresponding to the row and column in which it is positioned. Each of the groups of the access switch comprises a single column of posts, and accordingly, the designations for the posts therein bear as subscripts increasingly larger numerals starting at "1," from top to bottom, as viewed in the figure. The added designations R and L to the subscripts distinguish right and left portions of the access switch also as viewed in the figure.

Juxtaposed with the posts of the memory are two overlay films, a first film *f*1 of relatively high coercive force material and a second film *f*2 of relatively low coercive force material positioned between the first film and the posts. Typically, these films are one-eighth mil thick permalloy for the low coercive force material and one-half mil permalloy for the high coercive force material. Such films are available commercially. The end groups of posts have juxtaposed therewith a 1–1.5 mil film *f* of permalloy having the relative high coercive force of the first overlay film *f*1.

A first (column) conductor, designated X1, sequentially threads in an alternating sense between the posts of the left group of posts in the access switch. The conductor X1 is connected to an X pulse source 13 at one end and to ground at the other end. A second conductor, designated X2, threads between the posts of the right group of posts in mirror image fashion and is similarly connected between X pulse source 13 at one and and ground at the other end. A third conductor, designated Y1, connected at one end to a Y pulse source 14, threads between posts $12_{1L}$ and $12_{2L}$, between posts $12_{1L}$ and $12_{11}$ of the memory portion, about post $12_{1L}$, between posts $12_{2L}$ and $12_{3L}$, threads between the corresponding posts on the right portion of the access switch in mirror image fashion, and is connected to ground. A fourth conductor, designated Y2, threads between posts $12_{5L}$ and $12_{4L}$, between post $12_{5L}$ and post $12_{51}$ of the memory portion, about post $12_{5L}$, between posts $12_{4L}$ and $12_{3L}$, threads the corresponding posts of the right portion of the access switch in mirror image fashion and terminates at ground. The X pulse source 13 and the Y pulse source 14 are connected to a control circuit 15 by means of conductors 16 and 17, respectively. A fifth conductor forms a closed loop about post $12_{2L}$ and about posts $12_{21}$ through $12_{27}$ of the memory. Similar conductors form closed loops about post $12_{4L}$ and post $12_{41}$ through $12_{47}$, about post $12_{2R}$ and post $12_{214}$ through $12_{28}$, and about post $12_{4R}$ and posts $12_{414}$ through $12_{48}$. These posts comprise the word conductors of the memory and, accordingly, are designated *w*1, *w*2, *w*3, and *w*4, respectively. A plurality of conductors, designated digit conductors, thread between the posts of the memory portion. Each one of these conductors threads about the posts of two columns of posts in the memory. Thus there are seven digit conductors designated *d*1, *d*2 . . . *d*7. These conductors are identical; accordingly, only conductor *d*1 is shown and described. Specifically, conductor *d*1 originates and terminates at a digit pulse source 18, threading in a like sense between post pairs $12_{51}$–$12_{41}$ and $12_{41}$–$12_{31}$, and in an opposite sense between post pairs $12_{31}$–$12_{21}$ and $12_{21}$–$12_{11}$. Each digit conductor is further connected to a utilization circuit 19. These last-mentioned connections are represented by lines designated U1 . . . U7; the connections to the remaining digit conductors (not shown) are omitted. The digit pulse source 18 and the utilization circuit 19 are connected to control circuit 15 by means of conductors 20 and 21, respectively.

An understanding of the physical arrangement of the memory unit is facilitated with reference to the following brief discussion of its functional organization. The memory portion of FIG. 1 functions on a word-organized basis. Further, each word is arranged in a two-core-per-bit location fashion. In a waffle iron configuration, two-core-per-location organization is realized through three adjacent posts, the portion of the base plate therebetween, and the overlayer therebetween. FIG. 2 shows three adjacent posts $12_{11}$, $12_{21}$, and $12_{31}$ of the memory portion of FIG. 1 and, further, shows three adjacent posts $12_{1L}$, $12_{2L}$, and $12_{3L}$ of the left portion of the access switch. FIG. 3*a* shows a representative cross section through the set of posts of bit location BL1 of the memory portion taken along broken line Z–Z′ of FIG. 2. The equivalent "core" can be seen in FIG. 3*a* along broken closed lines designated C1 and C2. Information storage is effected in the overlay as is well known. Accordingly, posts $12_{11}$, $12_{21}$, and $12_{31}$ define one bit location, designated BL1 in the central memory portion of FIG. 1 and in FIG. 2. Similarly, posts $12_{31}$, $12_{41}$, and $12_{51}$ define a second bit location, designated BL 2, in the central memory portion of FIG. 1. Seven adjacent bit locations are organized into one word by each conductor. The memory portion M, thus, is organized into four binary words each comprising seven bit locations, the axes of the bit locations being generally orthogonal to the axes of the words.

A cross section along broken line B–B′ of FIG. 2 through location BL1L of the access switch is shown in FIG. 3*b*. As each set of three adjacent posts in the memory defines a bit location, so does each set of three adjacent posts in the access switch define a functional unit. The equivalent core arrangement therein is as described in connection with FIG. 3*a*. Although the functional unit in the access switch is, normally, not thought of as a bit location, the physical arrangement thereof is similar and it is so designated herein. Thus, posts $12_{1L}$, $12_{2L}$, and $12_{3L}$ as shown in FIG. 3*b* define a location designated BL1L, the posts $12_{3L}$, $12_{4L}$, and $12_{5L}$ define a location designated BL2L. The corresponding posts of the right portion of the access switch similarly define locations designated BL1R and BL2R. Thus, the access switch comprises four functional units.

Each functional unit (location) of the access switch is operated in a manner generally consistent with the operation of a conventional access switch as will become apparent hereinafter. In accordance with this invention, however, pulses are applied, selectively, to the X and Y conductors to enable series switching or, alternatively, single switching of the cores of a selected location of the access switch thereby producing pulses of differing amplitudes and polarities in the word conductor coupled thereto. Information is written into the memory portion by the presence of positive or, alternatively, negative pulses on the proper digit conductors in coincidence with the pulse on the word conductor.

An illustrative operation of the memory unit 10 in accordance with this invention will now be described. Since the illustrative memory portion M is word-organized and each word includes seven bit locations each, the illustrative word 1011010 will be stored and retrieved. Each bit location therein stores information alike, however. Accordingly, the storage and retrieval of both a binary "1" and a binary "0" will be discussed in connection with a representative bit location, and the discussion, then, will be extended to the sequential storage of illustrative words in accordance with the assumed operation.

First, the operation of the access switch and the pulses induced in associated word conductors by that operation will be described. A representative location BL1L of the access switch is shown in cross section in FIG. 3*b* as has been stated hereinbefore. When the representative location is operated in accordance with this invention, the various flux patterns to which the flux therein is driven are shown in FIG. 4. The flux in the overlay *f* of the representative location BL1L of the access switch is assumed initially to be directed to the right as viewed in row one of FIG. 4. (For a direct correspondence between the orientation of the directions of flux as shown by the arrows in the various figures herein and the orientation of the memory unit portion shown in FIG. 2, rotate the last-mentioned figure 90 degrees counterclockwise.) Flux, thus, is directed clockwise in cores C1 and C2 therein as viewed in FIG. 3*b*. This assumed direction will be shown to be the direction to which flux in the access switch is driven during the read operation in accordance with this invention.

At an arbitrary time, designated *t*1 in FIG. 5, a positive prime pulse is applied to conductor X1 by means of X pulse source 13 under the control of control circuit 15. In this connection, a prime pulse is one having an amplitude and duration such that only an insignificant pulse is induced, as a consequence thereof, in the word conductor coupled thereto. Typically, such pulses have a low rise time as shown in FIG. 5. In this connection, FIG. 5 is a plot of current versus time for the various pulses in the conductors in accordance with this invention. In response to the prime pulse, the flux in core C2 of each of locations BL1L and BL2L reverses; the flux in core C1 in each of those locations is merely shuttled because the flux therein already is in a direction to which urged by the prime pulse. The resulting flux pattern is shown in row two of FIG. 4. In this connection, an arrow is taken as representing one unit of flux. Subsequently, at a time designated *t2* in FIG. 5, a negative drive pulse is applied, similarly, to conductor X1. In response, the flux in cores C1 and C2 of each of locations BL1L and BL2L reverses. The resulting flux pattern is shown in row three of FIG. 4, designated "clear," and a large positive pulse, designated a *w*+ pulse, is induced thereby in each of conductors *w*1 and *w*2 as shown in FIG. 5. Then, at a time designated *t*3 in FIG. 5, a positive pulse, designated a Y1 pulse, is applied to conductor Y1 via the Y pulse source 14 under the control of control circuit 15. In response to the Y1 pulse, the flux in core C1 of location BL1L reverses as shown in row four of FIG. 4 designated "write." The flux in core C2 of location BL1R also coupled by conductor Y1 does not reverse because flux therein is already in a direction urged by the Y1 pulse (compare row one of FIG. 4). Thereafter, at a time designated *t*4 in FIG. 5, a positive pulse, designated a Y2 pulse, is similarly applied to conductor Y2. In response thereto, flux in core C1 of location BL2L is reversed as shown in row four of FIG. 4. In response to the Y1 and Y2 pulses, a negative pulse, designated a *w*— pulse, is induced in each of conductors *w*1 and *w*2, respectively. The foregoing operation of the access switch, accordingly, induces, in the associated word conductors, the pulses required therein for a sequential memory-write operation.

At an arbitrary time designated *t*5 in FIG. 5, a positive prime pulse is applied to conductor X1, as described hereinbefore, a returning the flux pattern of cores C1 and C2 each of bit locations BL1L and BL2L to that shown in row two of FIG. 4. Then, limited amplitude Y1 and Y2 pulses are applied in sequence, in the absence of a clear pulse (as described previously), at times designated *t*6 and *t*7, respectively. In response, the flux in core C2 (only) of locations BL1L and BL2L partially reverses, to the direction shown in row five of FIG. 4, inducing pulses, designated *wr* pulses, in conductors *w*1 and *w*2, respectively. In this connection, a *wr* pulse is of an amplitude to reverse flux only in the low coercive force overlay. Only partial reversal of a core C2 is provided during the time the memory produces a read out pulse because of the limited amount of flux to be switched at this time in the low coercive force overlay. In practice, the core C2 is fully switched to the condition shown in row one of FIG. 4. The full switching, however, is accomplished after the memory read-out pulse terminates. The *w*+, *w*—, and *wr* pulses are shown in FIG. 5. Although the foregoing operation has been described in terms of a timed sequence, it is to be understood that piggy-back structures are nondestructive in nature and, thus, the read pulse may be induced in associated word conductors as described in the absence of preceding clear and write pulses. Similarly, the clear and write pulses need not be preceded by read pulses.

For alternative storage of binary "1's" and "0's" into the representative bit location BL1 of the memory portion of the memory of FIG. 1, positive and negative pulses, termed "digit pulses," are applied to the digit conductor d1 coincident with the *w*— pulse on the word conductor *w*1. This is illustrated by the positive and negative pulses designated d+ and *d*— in FIG. 5. The resulting flux patterns in the bit location BL1 depend on the information previously stored there. All possible cases will be discussed.

The pertinent flux patterns when a "binary "1" is stored in a representative bit location already including therein a binary "0" are shown in FIG. 6*a*. The initial flux condition of bit location BL1 is represented by arrows directed to the right for both cores C1 and C2 as shown in row one of FIG. 6*a*. These arrows represent the flux direction in the high coercive force material of overlay *f*1 there. The flux direction for the low coercive force material of overlay *f*2, of course, is opposite. This is consistent with the operation of piggy-back memories where the high coercive force material resets the low coercive force mtaerial at the termination of the read pulse providing nondestructive read out.

In response to the negative pulse *x*1 on conductor *x*1 at time *t*2, the flux in each of cores C1 and C2 of, for example, location BL1L of the access switch, reverses direction inducing in conductor *w*1 a pulse *w*+ as shown in FIG. 5. The *w*+ pulse is directed to the right for core C1 and to the left for core C2 of bit location BL1 as indicated by the arrows so designated in FIG. 2. The magnetic field associated therewith reverses flux in core C2; not in core C1, however, because the flux in core C1 is already switched in the direction urged by the field. The right-hand rule shows us that switching in core C2 is upward as viewed in FIG. 5, or, in other words, to the left in the high coercive force overlay *f*1 of core C2 as represented by the corresponding arrow in the second row of FIG. 6*a*. The resulting flux pattern, flux in cores C1 and C2 directed right and left, respectively, is called the "clear" condition for the representative bit location BL1, as designated in FIG. 6*a*.

The flux pattern, in the location BL1L of the access switch as shown in the fourth row of FIG. 4, is achieved in response to the Y1 pulse only, applied after a negative *x*1 pulse. Flux is seen to reverse in only core C1 of location BL1L inducing, in conductor *w*1, the negative write pulse *w*— shown in FIG. 5. A positive digit pulse d+ is applied to, for example, digit conductor *d*1 as shown in FIG. 5, coincidentally with the *w*— pulse, polarity being determined with respect to the end of the digit conductor bearing the designation. In this connection, the digit pulse is applied by digit pulse source 18 under the control of control circuit 15. Digit pulse source 18, as well as the other sources described herein may be any sources capable of providing pulses in accordance with this invention. This negative pulse *w*— and the coincident positive digit pulse are in the same direction for core C1 and in the opposite directions for core C2 of bit location BL1 as shown by the arrows so designated in FIG. 2. Accordingly, the fields associated therewith aid for core C1 and oppose for core C2, causing flux reversal in the former and only insignificant flux shuttling in the latter. The resultant flux pattern is shown in the third row of FIG. 6*a*, designated write "1"H (for high coercive force material) as arrows directed to the left. The flux in the low coercive force material, of course, is directed in the opposite direction as shown in the fourth row of FIG. 6*a* designated write "1"L (for low coercive force material).

The flux pattern in the location BL1L of the access switch as shown in the fifth row of FIG. 4 is a result of a second pulse in the Y1 conductor applied after a prime pulse on the *x*1 conductor. Specifically in response to the second pulse in the Y1 conductor, the flux pattern changes from that shown in row two of FIG. 4 to that shown in row five. Only the flux in core C2 of location BL1L reverses (partially), inducing in conductor *w*1 a pulse *wr*, shown in FIG. 5. In this connection, the core C2 partially reverses during the time the memory is providing an output as mentioned hereinbefore. As far as the access switch is concerned, however, the core C2 is fully switched as shown in row one of FIG. 4. This full reversal is achieved by applying the pulse in the Y1 conductor for a time longer than the duration of the memory output pulse. The *wr* pulse is directed to the right for core C1 and to the left for core C2 for bit location BL1 as shown in FIG. 2 by the arrows so designated there. This pulse *wr* alone (the digit pulse, now terminated as shown in FIG. 5) is of sufficient amplitude to switch only the low coercive force material of overlay *f*2 for these cores. For cores C1 and C2, the flux in the low coercive force material is directed to the right as shown by the fourth row of FIG. 6*a*. By the right-hand rule, the flux in the low coercive force material of core C2 is switched upward as shown in FIG. 2, or in other words, to the left as shown in FIG. 6*a* in the sixth row. At the termination of the *wr* pulse, of course, the magnetic field of the high coercive force material resets the low coercive force material to the right. The flux in core C1 is merely shuttled further into saturation and back. The switching of the low coercive force material of core C2 induces a pulse in the digit conductor *d*1, negative with respect to the end of the conductor designated *d*1. This pulse is conducted via conductor U1 to utilization circuit 19.

It can be seen from the above that the *w*+ pulse switches the flux in only core C2 of the selected bit location. The pulse Y1 (*w*−) and the coincident *d*+ pulse switch the flux in only core C1 there.

If a binary "1" was stored in the selected bit location previously, the pulses tend to drive these cores individually as described. The initial flux condition, however, precludes switching of core C2 and only flux shuttling results. Specifically, the first row of FIG. 6*b* shows the arrows of both cores C1 and C2 directed to the left (that is, for the high coercive force material). The pulse *w*+ tends to switch the flux in core C2 to the left as in accordance with row two of FIG. 6*a*. Only insignificant flux shuttling results. Flux in core C1, however, is switched to the right by pulse *w*+. Subsequently, the *w*− and the *d*+ pulses switch the flux in core C1 to the left. The resulting flux pattern is as shown in row three of FIG. 6*b*. At this juncture a binary "1" is stored regardless of the prior information and the subsequent operations are identical to those already described.

The storing of a binary "0," when a "0" was stored previously, and, alternatively, when a "1" was stored previously, is similar to the storing of a binary "1" described. The primary difference in operation is that a negative digit pulse, *d*−, is used rather than a positive pulse. The pulses on the word conductor are as described. Specifically, the flux pattern for a "0" stored previously is shown in row one of FIG. 6*c*. The *w*+ pulse switches flux in core C2, of the representative bit location, to the left as shown in row two of FIG. 6*c*. The *w*+ pulse only shuttled core C1 because the flux in that core is in a direction to which urged by this pulse. The *w*− and the *d*− pulses are in opposing directions for core C1 of bit location BL1 and in aiding directions for core C2 thereof. This is indicated by the arrows, so designated, in FIG. 2. In response to the *w*− and the *d*− pulses, the flux in core C2 of bit location BL1 switches to the right, as shown in row three of FIG. 6*c*. At this juncture a "0" is stored as is shown by comparing the third row of FIG. 6*c* with the first row of FIG. 6*a*. That is to say, flux in both cores is directed to the right as shown in row three of FIG. 6*c*.

The storing of a binary "0" when a "1" was stored previously is quite similar. The initial condition for a stored "1" is shown in row one of FIG. 6*d*. The *w*+ pulse (direction as shown in FIG. 2) switches the flux in core C1, but not that in core C2. The resulting flux pattern is as shown in row two of FIG. 6*d*. Specifically, by the right-hand rule, core C1 switches downward as viewed in FIG. 2 (in the high coercive force material there) or, to the right as shown in row two of FIG. 6*d*. The *w*− pulse plus the *d*− pulse add for core C2 switching the flux in the core to the right as shown in row three in FIG. 6*d*. The flux pattern now is that assumed for a binary "0." The remaining operation is substantially as described hereinbefore. The pulse *wr* drives the flux in the low coercive force material of core C2 further into saturation and switches that of core C1 to the right as shown in lines six of FIGS. 6*c* and 6*d*. This flux switching induces a pulse in conductor *d*1, positive with respect to the end of the conductor designated *d*1. Again, this pulse is conducted via conductor U1 to utilization circuit 27.

In accordance with the assumed illustrative word 1011010, the train of pulses *w*+, *w*−, and *wr* are applied to word conductor *w*1. Coincident with the *w*− pulse, positive digit pulses *d*+ are applied to digit conductors *d*1, *d*3, *d*4, and *d*6. Also, coincidentally, negative digit pulses *d*− are applied to digit conductors *d*2, *d*5, and *d*7. As a result of these pulses, the flux patterns in the selected bit locations follow those shown in the first three rows of FIGS. 6*a*, 6*b*, 6*c* and 6*d*, depending on the previous information stored there. The pulse *wr* on word conductor *w*1 (in the absence of a coincident digit pulse) induces the positive and negative output pulses via the digit conductors which pulses are conducted, in parallel, to utilization circuit 19 via conductors U1, . . . and U7, respectively. In this connection, utilization circuit 19 is any utilization circuit capable of utilizing the parallel output in accordance with this invention.

The illustrative word is written into other bit locations, for example BL2L, of the memory by similarly pulsing the digit conductors, as described, coincidently with the pulse *w*− on word conductor *w*2. Since the access switch is conveniently operated on a sequential basis, these described pulses are provided sequentially on conductors *w*1 and *w*2, and the digit pulses are appropriately applied sequentially with this in mind. Sequential operation with respect to the remaining bit locations is achieved by applying to conductor X2 pulses corresponding to the pulses applied to conductor X1 and then pulsing conductors Y1 and Y2 sequentially. The pulse forms an arrangement are as shown in FIG. 5 for conductors X1, Y1 and Y2.

The pulses on conductor *d*1 also effect the flux conditions of other (nonselected) bit locations coupled to it. This is clear from FIG. 1. These pulses, however, are limited in amplitude to induce only insignificant flux shuttling in those other bit locations.

FIGS. 7*a* and 7*b* show two conventional $\varphi$ versus MMF hysteresis characteristics, where $\varphi$ is the flux and MMF is the magnetomotive force. The hysteresis characteristic of FIG. 7*a* is shown larger than that of FIG. 7*b* because it represents a core equivalent to that of two cores C1 and C2. The characteristic of FIG. 7*b* represents that of only one core, C2 for example. If a core coupled by a word conductor, say *w*1, had a hysteresis characteristic corresponding to that shown in FIG. 7*a*, then if the core is switched, for example, from negative maximum remanence, *r*−, to positive maximum remanence, *r*+, the pulse induced in conductor *w*1 is proportional to the total flux switched, that is, $\varphi_{i1}+\varphi_r$. If the core is one of a column of cores as in the access switch of FIG. 1, other noneselected cores partially switch, inducing in associated conductors pulses proportional to the reversible flux $\varphi_r$, a difference of, typically, fifty to one. If, during a read operation, the selected core is partially switched from the negative remanence point *r*− to a point designated P in FIG. 7*a*, then there is induced on the conductor associated with the selected core a pulse proportional to $\varphi_{i2}+\varphi_r$, where $\varphi_{i2}$ is more nearly (equal to, assume approximately) equal to $\varphi_r$. The pulse induced on the conductors associated with the nonselected conductors, however, is still proportional to $\varphi_r$. The ratio between the pulses induced on the selected conductor and those on the nonselected conductors under these conditions is typically only five to one. If, effectively, a smaller characteristic (for example, corresponding to one-half the amount of flux) is employed during the read operation, the point P, to which flux is switched in response to a read pulse is desirably higher on the hysteresis characteristic providing a much more desirable ratio between the amplitudes of pulses induced by selected locations and those induced by nonselected locations. The ratio under these conditions is typically ten to one, an improvement by a factor of two. The improvement permits access of a number of words in the memory double that possible, for example, with a conventional bias core switch. Since it is most economical, from the standpoint of the required number of pulse sources, to drive the access switch, to utilize a square arrangement, in practice, four times the number of locations are accessed in accordance with this invention.

Further, the two-core-per-bit organization of the access switch in accordance with this invention permits even further shuttle flux cancellation further reducing pulses induced in nonselected word conductors. This is consistent with conventional two-core-per-bit operation.

This improvement permits the use of a waffle iron configuration for the access switch itself in a sequential access memory. As a result, the access switch may be fabricated from the same waffle iron base plate. Since circuitry for such construction is fabricated via well known photo-etching techniques, that is, conductor layers of materials such as copper are preshaped, spaced apart by electrical insulators such as Mylar and fitted over the posts of the waffle iron, little extra expense is incurred in the fabrication of the access switch. Consequently, the access switch is provided for, at most, a small fraction of one cent per bit, whereas their cost in prior art memories is about one to one and one-half cents per bit. Such a cost reduction renders economically feasible memories with small numbers of bits per word and/or relatively few words.

What have been described are considered to be only illustrative embodiments of the present invention. Accordingly, it is to be understood that other and numerous arrangements may be devised by one skilled in the art without departing from the spirit and scope of this invention.

What is claimed is:

1. A multilocation access switch including two cores per location, said cores comprising material having substantially rectangular hysteresis characteristics, and drive means coupled to the cores of each of said locations in a manner to switch flux in only enabled ones of said cores, said last-mentioned means including first conductors coupled in an opposing sense to the cores of each location of different first sets of locations in said access switch and pulse means for applying to said first conductors, selectively, a prime pulse of a first polarity followed by a switching pulse of a second polarity or a prime pulse alone thereby selectively enabling said cores, said drive means also including second conductors coupled to the cores of each location of different second sets of locations in a like sense and means for applying pulses sequentially to said second conductors for switching enabled cores.

2. An access switch in accordance with claim 1 in combination with a sequential access word-organized piggy-back waffle iron memory, said memory including a plurality of word conductors, each of said word conductors being coupled to both cores of a location of said access switch.

3. An access switch in accordance with claim 1 wherein each of said locations comprises a substantially low reluctance base plate having three posts thereon and an overlay member juxtaposed with said posts, adjacent posts of each location defining said cores thereabout.

4. An access switch in accordance with claim 3 in combination with a sequential access word-organized piggy-back waffle iron memory, said memory including a plurality of word conductors, each of said word conductors being coupled to both cores of a location of said access switch.

5. A combination in accordance with claim 4 wherein said memory includes a low reluctance base plate integral with the base plate of said access switch.

6. A sequential access memory comprising a first magnetic member of a relatively low reluctance material, said first member having a plurality of posts thereon, said posts being arranged in first and second groups, said posts being arranged generally in rows and columns within each group, a second member of a magnetic material having substantially rectangular hysteresis characteristics juxtaposed with said posts of said first group, a third and fourth member of magnetic materials having substantially rectangular hysteresis characteristics, said third member being juxtaposed with said posts of said second group, said fourth member being juxtaposed with said third member, said fourth member having a higher coercive force than that of said third member, the posts of each of said groups being organized into arrays of three defining two-core-per-bit locations thereabout, and drive means including a first conductor coupled to the cores of each of said locations in said first group in opposing senses, and a plurality of second conductors each coupled to the cores of a location in said first group in a like sense, a plurality of third conductors each coupled to the cores of a location in said first group and to the cores of a plurality of bit locations in said second group, said drive means also including means connected to said first and second conductors for selectively switching the flux in both cores of a location in said first group and the flux in one core of a location therein for inducing in the corresponding third conductor pulses having different amplitudes and polarities.

7. A sequential access memory comprising a first magnetic member of relatively low reluctance material, said first member having a plurality of posts thereon, said posts being arranged in first, second, and third groups, said posts being arranged generally in rows and columns within each group, second and third members of a magnetic material having substantially rectangular hysteresis characteristics juxtaposed with said posts of said first and third group, respectively, fourth and fifth members of magnetic materials having substantially rectangular hysteresis characteristics, said fourth member being juxtaposed with said posts of said second group, said fifth member being juxtaposed with said fourth member, said fifth member having a higher coercive force than that of said fourth member, the posts of each of said groups being organized into arrays of three defining two-core-per-bit locations thereabout, and drive means including first and second conductors coupled in opposing senses to the cores of each location in said first and third groups, respectively, a plurality of third conductors each coupled in like senses to the cores of corresponding locations in said first and third groups, a plurality of fourth conductors each coupled to the cores of a bit location in said first and third groups and to the cores of a plurality of bit locations in said second group, said drive means also including means connected to said first, second, and third conductors for selectively switching the flux in both cores of a location in said first and third groups and the flux in one core of a location therein for inducing in corresponding fourth conductors pulses having different amplitudes and polarities.

References Cited

UNITED STATES PATENTS

| | | | |
|---|---|---|---|
| 2,768,367 | 10/1956 | Rajchman | 340—174 |
| 3,004,172 | 10/1961 | Bader | 340—174 X |
| 3,008,054 | 11/1961 | Saltz | 340—174 X |
| 3,274,571 | 9/1966 | Bobeck et al. | 340—174 |

BERNARD KONICK, *Primary Examiner.*

J. F. BREIMAYER, *Assistant Examiner.*